(12) United States Patent
Ruys

(10) Patent No.: US 8,359,757 B1
(45) Date of Patent: Jan. 29, 2013

(54) ILLUMINATING CARPENTER'S LEVEL

(76) Inventor: Robert C. Ruys, Woodstock (CA)

( * ) Notice: Subject to any disclaimer, the term of this patent is extended or adjusted under 35 U.S.C. 154(b) by 0 days.

(21) Appl. No.: 12/837,142

(22) Filed: Jul. 15, 2010

Related U.S. Application Data

(60) Provisional application No. 61/270,891, filed on Jul. 15, 2009.

(51) Int. Cl.
*G01C 9/32* (2006.01)

(52) U.S. Cl. .......................... 33/348.2; 33/381; 33/389

(58) Field of Classification Search .................. 33/348, 33/348.2, 365, 379, 381, 389, 390
See application file for complete search history.

(56) References Cited

U.S. PATENT DOCUMENTS

| | | | |
|---|---|---|---|
| 794,753 A | 7/1905 | Stetson | |
| 807,873 A * | 12/1905 | Sharp | 33/389 |
| 824,109 A * | 6/1906 | Gibson | 33/389 |
| 940,671 A * | 11/1909 | Brittain | 33/389 |
| 948,570 A * | 2/1910 | Andersen | 33/348.2 |
| 1,566,541 A | 12/1925 | Kirby | |
| 1,653,398 A * | 12/1927 | Hasemann | 33/348 |
| 2,944,144 A | 7/1960 | Naylor | |
| 3,584,212 A | 6/1971 | Hansen | |
| 4,407,075 A | 10/1983 | MacDermott et al. | |
| 4,876,798 A | 10/1989 | Zimmerman | |
| 4,912,854 A | 4/1990 | Weadon | |
| 5,020,232 A | 6/1991 | Whiteford | |
| 5,075,978 A | 12/1991 | Crowe | |
| 5,180,221 A * | 1/1993 | Yoder | 362/101 |
| 5,414,937 A * | 5/1995 | Denley | 33/379 |
| D453,479 S | 2/2002 | Greene | |
| 6,957,494 B1 * | 10/2005 | Foran | 33/379 |
| 7,779,545 B2 * | 8/2010 | Kallabis | 33/379 |

* cited by examiner

*Primary Examiner* — Christopher Fulton
(74) *Attorney, Agent, or Firm* — Montgomery Patent & Design LLC; Robert C. Montgomery

(57) ABSTRACT

A carpenter's level with an integral bubble vial illumination system is herein disclosed. A plurality of level vials is illuminated by lamps located at either end to light the vials internally. The vials are arranged in close parallel pairs having a blackout panel between for enhanced accurate viewing of the bubbles from either side of the level. Power to the lamps is supplied by a battery which is charged by solar cells, thereby reducing battery changes. The level is equipped with a graduated slope indicator port located on the top surface of the level to easily measure sloped surfaces. An auto-off feature will also be integrated to save power.

5 Claims, 5 Drawing Sheets

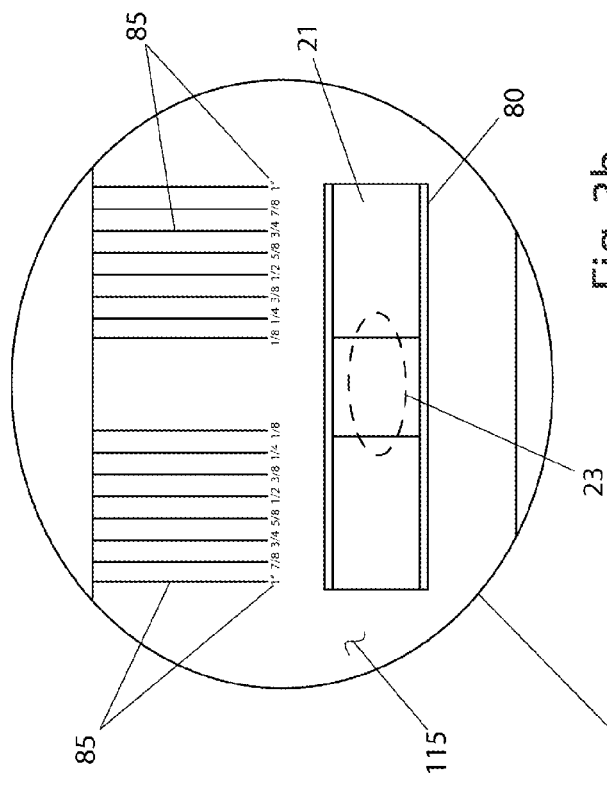
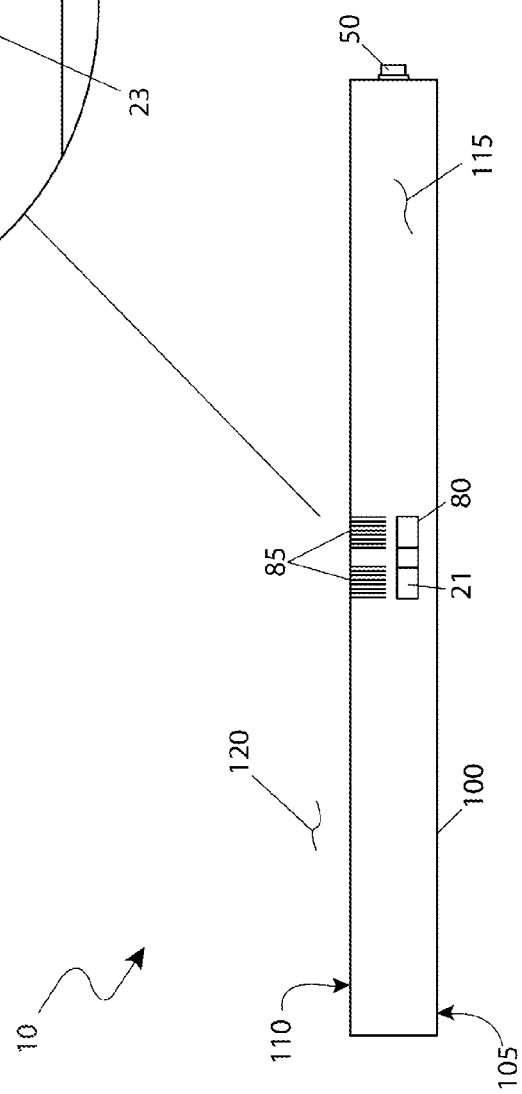

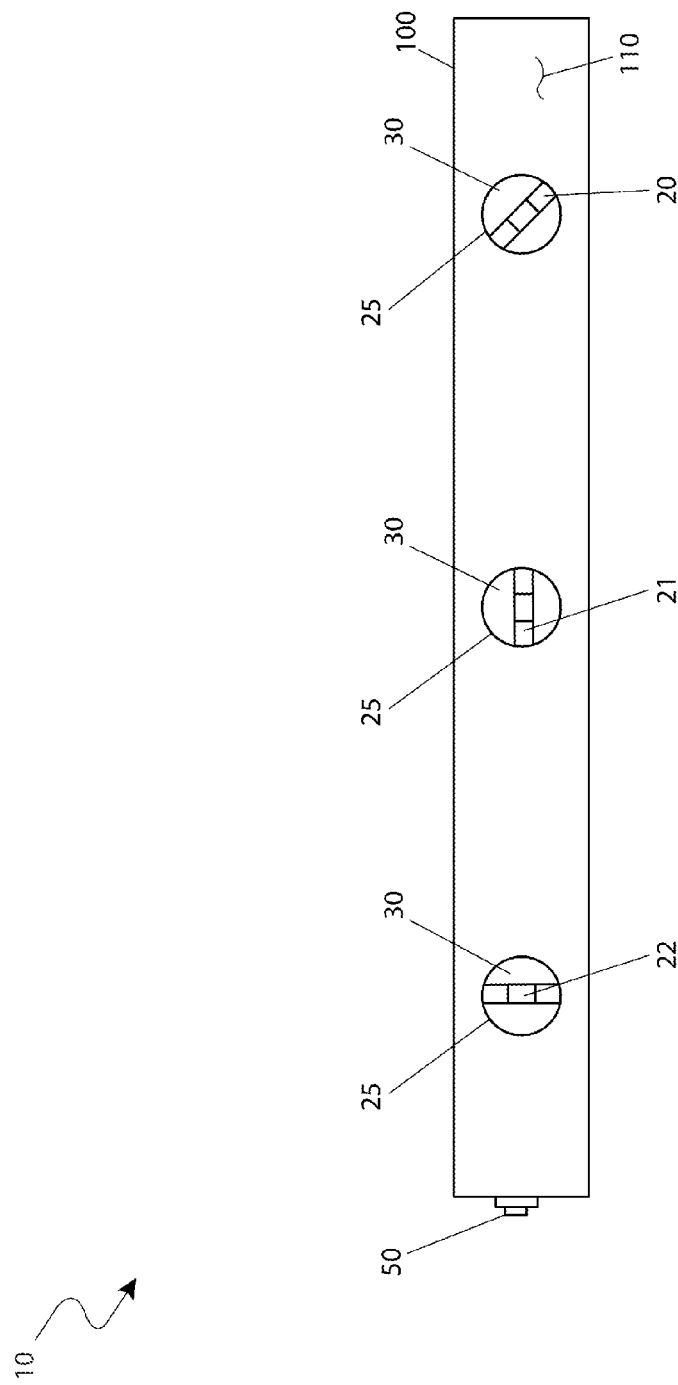

ILLUMINATING CARPENTER'S LEVEL

RELATED APPLICATIONS

The present invention was first described in and claims the benefit of U.S. Provisional Application No. 61/270,891 filed Jul. 15, 2009, the entire disclosures of which are incorporated herein by reference.

FIELD OF THE INVENTION

The present invention relates generally to leveling devices, and in particular, to a level provided with an integral illuminating means for providing levelness measurements on a work surface in low-light situations.

BACKGROUND OF THE INVENTION

Many construction projects require proper alignment of various components in relation to a ground surface. Such practice allows for proper construction of necessarily level surfaces such as floors and the like and helps to maintain relative alignment between various portions of the construction. Levels are the most common tool utilized for such applications. In general, such leveling devices utilize a gravity based sight mechanism to ensure that a desired surface is perpendicular or otherwise properly aligned in relation to the downward pull of gravity.

A primary disadvantage of such devices is that due to the sight based nature of the levelness indicators, proper and accurate assessment of the level by a user's eyesight is required. Such conditions require the user to be able to accurately assess the level's readings in order to ensure proper construction. In addition to requiring training and skill on the part of the user, such readings are made difficult and potentially inaccurate by environmental factors which limit visibility such as shadows, low-light situations, and the like. Such factors are particularly prevalent on construction sites due to the transitory nature of the construction which often precludes the presence of proper lighting and visibility.

Various attempts have been made to provide illuminated leveling tools. Examples of these attempts can be seen by reference to several U.S. Pat. No. 1,566,541, issued in the name of Kirby, describes an apparatus which provides a removably attachable electric lighting means adaptable to a variety of existing leveling devices.

U.S. Pat. No. 4,407,075, issued in the name of MacDermott et al., describes an illuminated spirit vial and level with an integral switch-activated battery powered illuminating lamp.

U.S. Pat. No. 5,075,978, issued in the name of Crowe, describes an illuminated spirit level with a plurality of individually disposed illumination means which provides user actuated lighting to each of a plurality of conventional spirit vials.

Additionally, ornamental designs for an illuminated level exist, particularly U.S. Pat. No. D 453,479. However, none of these designs are similar to the present invention.

While these apparatuses fulfill their respective, particular objectives, each of these references suffer from one (1) or more of the aforementioned disadvantages. Many such apparatuses are difficult to view from particular angles in poor lighting conditions. Also, many such apparatuses require frequent replacement of the powering means which leave the devices susceptible to failure during use. Furthermore, many such apparatuses do not provide a full desired range of leveling functionality. In addition, many such apparatuses do not provide integral automatic features for operation of electronic components of the invention in a manner which increases convenience to a user. Accordingly, there exists a need for an illuminated construction level without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide simple, accurate visibility to the level indicators of a spirit level in a manner which is simple, cost-effective, and requires little or no maintenance on the part of a user. Thus, the object of the present invention is to solve the aforementioned disadvantages and provide for this need.

To achieve the above objectives, it is an object of the present invention to comprise an illuminating carpenter's level which provides enhanced visibility in low-light conditions while functioning in a similar manner as a conventional level.

Another object of the present invention is to comprise conventional spirit level features including a plurality of integral diagonal, horizontal, and vertical vials contained within a durable level housing.

Yet still another object of the present invention is to provide individual lighting to each vial via a plurality of corresponding integral battery-powered lamps. The illumination provided by the lamps is intended to enhance the utility of the level by increasing reading accuracy and reduce time spent viewing the level.

Yet still another object of the present invention is to provide renewable electrical power to the lamps via an integral replaceable rechargeable battery which is further charged by a pair of solar cells located on an exterior portion of the level. The batteries are able to be replaced via a battery compartment cover. The frequency of replacement is reduced by automatic recharging of the battery via the solar cells.

Yet still another object of the present invention is to provide enhanced visibility of each vial via a corresponding blackout panel which comprises a dark flat disc positioned within a vial window between each pair of vials. The blackout panel provides a dark backdrop which allows a user to clearly and accurately view the position of a bubble within the vial while illuminated by a corresponding lamp.

Yet still another object of the present invention is to allow a user to selectively actuate the illuminating means via a switch located on an exterior portion of the housing. The switch is of a low-profile design so as not to interfere with normal functioning of the apparatus.

Yet still another object of the present invention is to conserve battery power via an integral control module which comprises an auto-off software timer circuit for automatically shutting off the illuminating means after a prescribed period of non-use.

Yet still another object of the present invention is to provide a means for a user to accurately assess the slope of the level via a slope indicator port and adjacent numeric scale along a top surface of the apparatus. The slope indicator port provides a means for a user to observe a relative position of an indicating bubble along the numeric scale.

Yet still another object of the present invention is to provide a method of utilizing the device that provides a unique means of obtaining the apparatus, providing it with a battery powering means, selectively activating the lamps via the switch, easily and accurately viewing the position of a bubble within any of the plurality of desired vials by viewing the illuminated vial against a corresponding blackout panel, automatically recharging the device via the solar panels, automatically conserving power via automatic shutoff actuated by the control module, easily replacing a battery if need, providing further leveling assessment via the slope indicator port, and allowing a user to accurately level a desired object or surface in a wide range of visibility conditions.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3a is a top view of the illuminating carpenter's level 10 depicting a slope indicator port 80, according to a preferred embodiment of the present invention;

FIG. 3b is a close-up view of the indicator port portion 80 of the illuminating carpenter's level 10, according to a preferred embodiment of the present invention;

FIG. 4 is a rear view of FIG. 1, according to a preferred embodiment of the present invention; and, FIG. 5 is an electrical block diagram of the illuminating carpenter's level 10, according to a preferred embodiment of the present invention.

Figure 1:
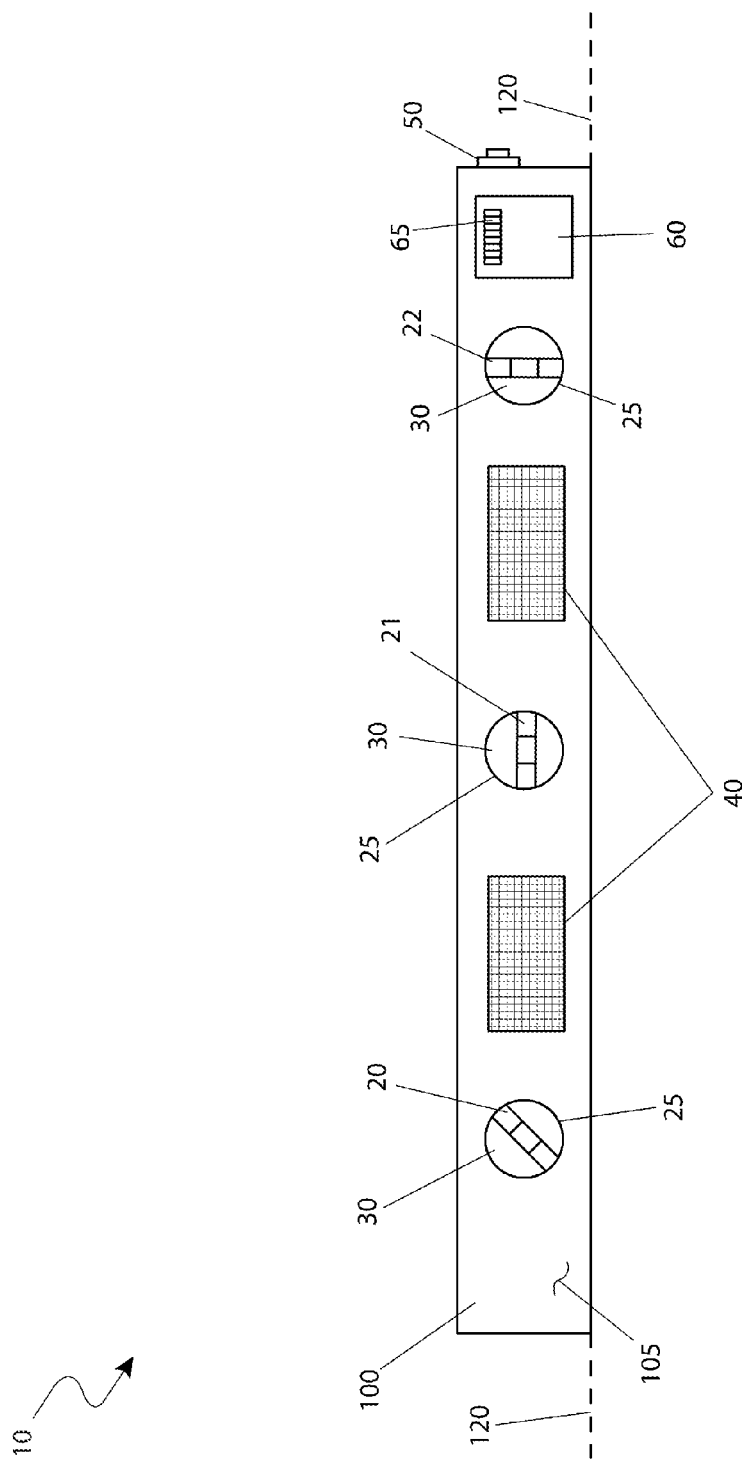
FIG. 1 is a front view of an illuminating carpenter's level 10, according to a preferred embodiment of the present invention.

| DESCRIPTIVE KEY | |
|---|---|
| 10 | illuminating carpenter's level |
| 20 | diagonal vial |
| 21 | horizontal vial |
| 22 | vertical vial |
| 23 | bubble |
| 25 | vial window |
| 30 | blackout panel |
| 40 | solar cell |
| 50 | switch |
| 60 | control module |
| 65 | battery cover |
| 70 | lamp |
| 75 | electrical wiring |
| 80 | slope indicator port |
| 85 | numeric scale |
| 90 | battery |
| 95 | circuit board |
| 100 | housing |
| 105 | front surface |
| 110 | rear surface |
| 115 | top surface |
| 120 | work surface |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an illuminating carpenter's level (herein described as the "apparatus") 10, which provides a levelness measuring device comprising illuminated indicator vials 20, 21, 22 to aid in visibility of indicator bubbles 23 when working in low-light situations. The apparatus 10 is used in a similar manner as a conventional carpenter's level; however, the apparatus 10 provides a plurality of integral battery-powered lamps 70 which illuminate a pair of diagonal vials 20 positioned at a forty-five degree (45°) angle, a pair of horizontal vials 21, and a pair of vertical vials 22. Said vials 20, 21, 22 are built into the apparatus 10 and are arranged in close parallel pairs being separated by respective blackout panels 30 for improved visibility. The apparatus 10 further provides a continuous power supply system comprising a pair of solar cells 40, a lamp activation switch 50, a control module 60, and a battery 90. The apparatus 10 is to be fabricated using lightweight and durable materials such as plastic, wood, and metal.

Referring now to FIGS. 1 and 4, front and rear views of the apparatus 10, according to the preferred embodiment of the present invention, are disclosed. The apparatus 10 utilizes similar construction as conventional carpenter levels providing a rugged elongated rectangular housing 100. The housing 100 is envisioned to be introduced in standard lengths such as, but not limited to: twenty-four (24) and forty-eight (48) inches; however, it is understood that the concept may be incorporated into levels having a variety of other lengths equally well. The housing 100 is to comprise three (3) round vial windows 25 of a suitable diameter so as to facilitate respective pairs of lamps 70, pairs of vials 20, 21, 22, and a blackout panel 30. The lamps 70 are permanently and stationarily mounted within the housing 100 at a position which is adjacent to end portions of each pair of vials 20, 21, 22. Said lamps 70 preferably comprise light-emitting diodes (LED); however, other illuminating devices such as incandescent bulbs may be provided with equal benefit as well. The lamps 70 provide a means to illuminate the vials 20, 21, 22 which increase a user's bubble reading accuracy, saves time, and reduces extra work when using the apparatus 10. The arrangement of the vials 20, 21, 22 in pairs enables a user to utilize both sides of the apparatus 10 equally well having one (1) vial toward a front surface 105 and one (1) vial facing a rear surface 110 being separated by the blackout panel 30. The blackout panels 30 comprise round flat discs being positioned within said vial window 25 between each pair of vials 20, 21, 22 to enhance viewing of the illuminated vials 20, 21, 22 and included bubbles 23. Said blackout panels 30 are envisioned being made using extruded plastic sheet stock being painted black and being permanently affixed within said vial windows 25 using common adhesives.

The apparatus 10 is powered by a renewable electrical power source via a pair of solar cells 40 which are permanently mounted to a front surface 105 of the housing 100 to supply power to one (1) or more internal replaceable rechargeable batteries 90. The solar cells 40 comprise miniature photovoltaic units approximately three (3) inches in width and two (2) inches in height being located on a single side surface of the apparatus 10 between pairs of adjacent vial windows 25. The switch 50 provides a means to initiate a flow of electrical power to the lamps 70 and preferably comprises a momentary-contact push button device to establish power from said batteries 90 to the lamps 70 (see FIG. 5). The switch 50 is to be of a low-profile design so as not to interfere with normal functions of the apparatus 10 and is to be located on a side surface of the apparatus 10.

Figure 2:
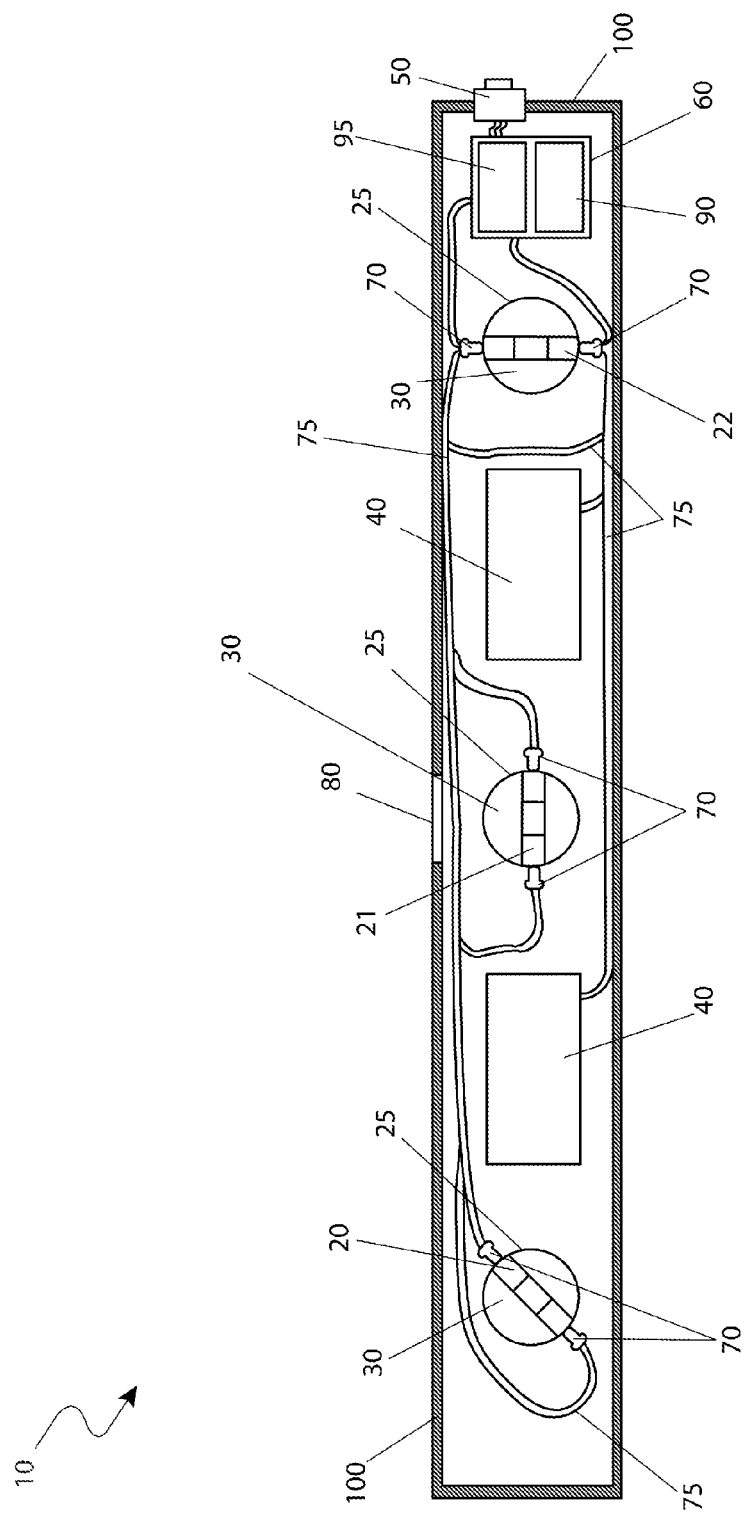
FIG. 2 is a cut-away view of the illuminating carpenter's level 10, according to a preferred embodiment of the present invention.

Referring now to FIG. 2, a cut-away view of the apparatus 10, according to the preferred embodiment of the present invention, is disclosed. An internal arrangement of electrical and electronic components of the apparatus 10 is illustrated here. The apparatus 10 comprises an internal microprocessor-based control module 60 which protectively houses electrical and electronic equipment such as, but not limited to: a printed circuit board 95, the battery 90, embedded software, and input and output signal processing circuitry. During an extended idle period an auto-off feature of the apparatus 10 will automatically curtail a flow of power to the lamps 70 via the control module 60 which comprises an auto-off software timer circuit, thereby conserving power stored in the battery 90. The circuit board portion 95 of the control module 60 provides board level components to regulate and direct a charging current from the solar cells 40 to the batteries 90, and in turn supply current to the lamps 70 upon pressing the switch 50 (see FIG. 5). The housing 100 further comprises a flush-mounted battery cover 65 enabling user access to said control module 60 and to the batteries 90 allowing easy replacement of said batteries 90 as needed. Said battery cover 65 is envisioned to comprise a conventional thumb grip feature providing easy opening. The apparatus 10 further comprises interconnecting electrical wiring 75 forming functional circuits between the control module 60, the switch 50, the batteries 90, the solar cells 40, and the lamps 70 using common copper conductors.

Referring now to FIG. 3, a top view of the apparatus 10 depicting the slope indicator port 80, according to the preferred embodiment of the present invention, is disclosed. The housing 100 comprises a slope indicator port 80 and an adjacent numeric scale 85 along the top surface 115 of the apparatus 10. The slope indicator port 80 comprises a rectangular-shaped vertical aperture being centered above a horizontal vial 21 and having an adjacent numeric scale 85 which is printed or engraved upon said housing 100. The slope indicator port 80 provides a means for a user to observe a relative position of a subjacent indicating bubble 23 and the numeric scale 85. Said numeric scale 85 comprises a plurality of graduated and numerically identified parallel lines representing a proportional slope over a specific length of a subjacent working surface 120 onto which the apparatus 10 is placed, for example, one-quarter (¼) inch over a four (4) foot length.

Figure 5:
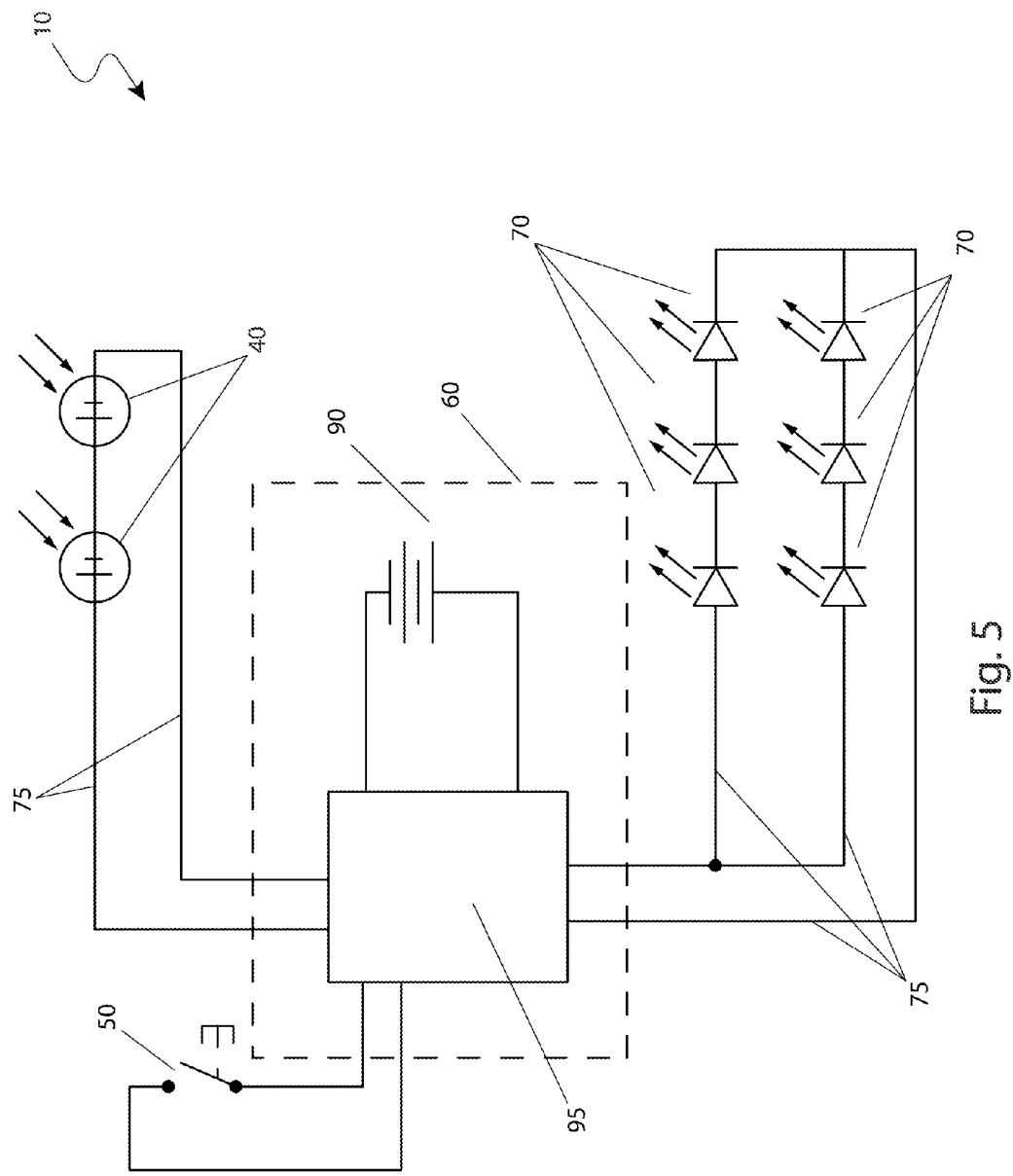

Referring now to FIG. 5, an electrical block diagram of the apparatus 10, according to the preferred embodiment of the present invention, is disclosed. The apparatus 10 comprises a microprocessor-based control module 60 to control the solar cells 40, charging of the battery 90, and powering the lamps 70. The apparatus 10 comprises a control module 60 which contains a circuit board 95 and at least one (1) battery 90. The circuit board 95 receives and regulates a current from the solar cells 40 to maintain a charge of the batteries 90 which in turn powers the lamps 70 in accordance with software within said circuit board 95. Said circuit board 95 provides board-level input and output capabilities which receive an initiating signal from the pushbutton switch 50 and in turn directs a flow of current to the lamps 70 for a preset period of time as defined by an internal software timer. Said switch 50, control module 60, solar cells 40, and lamps 70 are interconnected using common electrical wiring 75 routed within the housing 100 (see FIG. 2).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIG. 1 and FIG. 3.

The method of utilizing the apparatus 10 may be achieved by performing the following steps: procuring a model of the apparatus 10 having a desired length; using removing the battery cover 65 to install a fresh battery or batteries 90 within the control module 60; resting the apparatus 10 upon a work surface 120 to be leveled or measured; pressing the switch 50 to initiate power to illuminate the lamps 70 and subsequently the vials 20, 21, 22; viewing an appropriate vial 20, 21, 22 to determine if said work surface 120 is level; leveling or adjusting said surface 120 as needed; repeating a measuring and leveling procedure as needed to complete a work project; turning off the lamps 70 by pressing the switch 50 or allowing the embedded software timer within the circuit board 95 to time out; and, benefiting from improved reading accuracy due to integrated lighting within a level afforded a user of the present invention 10.

The method of utilizing the slope indicator port portion 80 of the apparatus 10 may be achieved by performing the following additional steps: resting the apparatus 10 upon a work surface 120 of an object whose slop is to be measured; pressing the switch 50 to initiate power to illuminate the vials 20, 21, 22; viewing a bubble portion 23 of the horizontal vial 21 being subjacent to the slope indicator port 80, with regards to the adjacent numeric scale 85; determining a quantifiable slope of the subject work surface 120; adjusting a position and subsequent slope of said object's surface 120 until obtaining a desired numeric slope as indicated upon the numeric scale 85; and, repeating the slope measurement and adjustment process as needed to obtain a desired result.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An illuminating carpenter level for providing levelness measurements on a work surface in low-light situations, said illuminating carpenter level comprising:
   a housing having front, rear and top surfaces;
   a plurality of vial windows located at said front and rear surfaces of said housing respectively;

three sets of pairs of vials including one pair each of diagonal, horizontal and vertical vials located within said vial windows respectively, each of said pairs of diagonal, horizontal and vertical vials having an indicator bubble located therein;

a slope indicator port located along said top surface and centered above said pair of horizontal vials; and, a numeric scale located along said top surface adjacent to said pair of horizontal vials;

wherein said slope indicator port is a rectangular-shaped vertical aperture, wherein said slope indicator port enables a user to observe a relative position of said indicating bubble of said pair of horizontal vials and said numeric scale; wherein said numeric scale includes a plurality of graduated and numerically identified parallel lines representing a proportional slope over a specific length;

wherein said vial windows comprises:

a plurality of blackout panels permanently affixed between each of said pairs of diagonal, horizontal and vertical vials respectively;

a plurality of lamps permanently mounted at end portions of each of said pairs of diagonal, horizontal and vertical vials respectively; and, a power supply system electrically coupled to said lamps;

wherein said blackout panels enhance viewing of each of said pairs of diagonal, horizontal and vertical vials and said bubbles respectively;

wherein said lamps are located completely exterior of said end portions of each of said pairs of diagonal, horizontal and vertical vials and remain completely exposed exterior thereof respectively;

wherein said slope indicator port is spaced from each of said vial windows and located on a different plane therefrom respectively.

2. The illuminating carpenter level of claim 1, wherein one of said pairs of diagonal, horizontal and vertical vials of each of said sets of vials is mounted towards said front surface of said housing and another of said pairs of diagonal, horizontal and vertical vials of each of said sets of vials is mounted toward said rear surface of said housing;

wherein each of said pairs of diagonal, horizontal and vertical vials are separated by said blackout panels;

wherein said lamps illuminate said pair of diagonal vials are positioned at a forty-five degree angle relative to a longitudinal length of said housing;

wherein said lamps illuminate said pair of horizontal vials are aligned parallel relative to said longitudinal length of said housing; and, wherein said lamps illuminate said pair of vertical vials are aligned orthogonal relative to said longitudinal length of said housing.

3. The illuminating carpenter level of claim 2, wherein said power supply system comprises:

a pair of solar cells mounted to said front surface of said housing;

a plurality of rechargeable batteries located inside said housing; and, a lamp activation switch located on a side surface of said housing;

wherein said solar cells supply power to said rechargeable batteries; and, wherein said switch selectively provides a flow of electrical power from said battery to said lamps.

4. The illuminating carpenter level of claim 3, wherein said power supply system further comprises: a control module electrically coupled to said lamp activation switch, said control module being capable of receiving and regulating the current from said solar cells to maintain a charge of said batteries;

wherein said control module automatically curtails a flow of power to said lamps to conserve power stored in said battery.

5. An illuminating carpenter level for providing levelness measurements on a work surface in low-light situations, said illuminating carpenter level comprising:

a housing having front, rear and top surfaces;

a plurality of vial windows located at said front surface of said housing respectively;

three sets of pairs of vials including one pair each of diagonal, horizontal and vertical vials located within said vial windows respectively, each of said pairs of diagonal, horizontal and vertical vials having an indicator bubble located therein;

a slope indicator port located along said top surface and centered above said pair of horizontal vials; and, a numeric scale located along said top surface adjacent to said pair of horizontal vials;

wherein said slope indicator port is a rectangular-shaped vertical aperture, wherein said slope indicator port enables a user to observe a relative position of said indicating bubble of said pair of horizontal vials and said numeric scale; wherein said numeric scale includes a plurality of graduated and numerically identified parallel lines representing a proportional slope over a specific length;

wherein said vial windows comprises:

a plurality of blackout panels permanently affixed between each of said pairs of diagonal, horizontal and vertical vials respectively;

a plurality of lamps permanently mounted at end portions of each of said pairs of diagonal, horizontal and vertical vials respectively; and, a power supply system electrically coupled to said lamps;

wherein said blackout panels enhance viewing of each of said pairs of diagonal, horizontal and vertical vials and said bubbles respectively;

wherein said lamps are located completely exterior of said end portions of each of said pairs of diagonal, horizontal and vertical vials and remain completely exposed exterior thereof respectively; and, wherein said slope indicator port is spaced from each of said vial windows and located on a different plane therefrom respectively.

* * * * *